United States Patent [19]
Muller

[11] 3,755,646
[45] Aug. 28, 1973

[54] METHOD AND DEVICE FOR BALANCING ROTORS

[75] Inventor: Richard Muller, Worfelden, Germany

[73] Assignee: Gebr. Hofmann KG, Postfach, Germany

[22] Filed: July 2, 1971

[21] Appl. No.: 159,444

[30] Foreign Application Priority Data
July 2, 1970 Germany............... P 20 32 893.2

[52] U.S. Cl................ 219/121 LM, 219/121 EM
[51] Int. Cl............................................. B23k 27/00
[58] Field of Search................ 219/121 L, 121 EB, 219/69

[56] References Cited
UNITED STATES PATENTS

| | | |
|---|---|---|
| 3,259,730 | 7/1966 | Wehoe et al................ 219/121 LM |
| 2,346,975 | 4/1944 | Laboulais........................ 219/69 M |
| 3,482,075 | 12/1969 | Wilde............................ 219/121 L |
| 3,621,180 | 11/1971 | Rolff............................. 219/121 L |
| 3,398,237 | 8/1968 | Paidosh......................... 219/121 L |
| 3,472,998 | 10/1969 | Popick et al.................. 219/121 L |

Primary Examiner—J. V. Truhe
Assistant Examiner—George A. Montanye
Attorney—Cushman, Darby & Cushman

[57] ABSTRACT

The invention relates to a method and device for balancing rotors where the unbalance is eliminated step by step during rotation of the rotor through momentary periodical bombardment by laser beams of high intensity.

22 Claims, 9 Drawing Figures

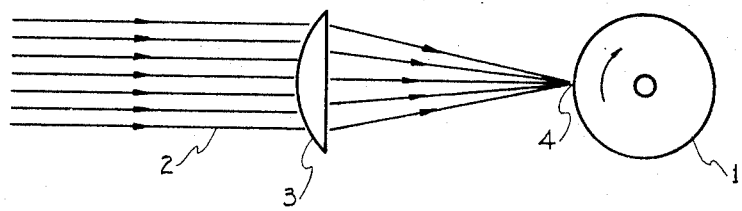
Fig. 1
Fig. 2 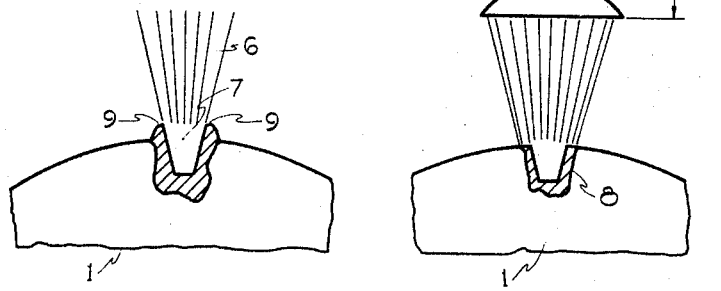 Fig. 3
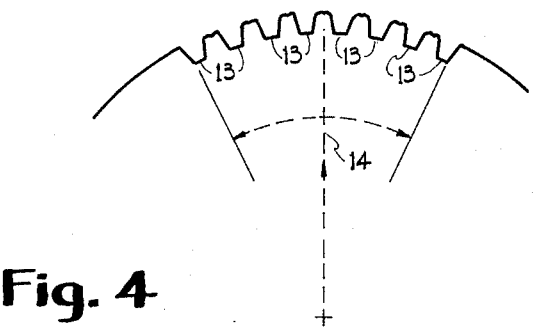
Fig. 4
RICHARD MÜLLER
INVENTOR
BY Cushman, Darby, & Cushman
ATTORNEY

RICHARD MÜLLER
INVENTOR

BY Cushman, Darby, & Cushman
ATTORNEY

RICHARD MÜLLER
INVENTOR

RICHARD MÜLLER
INVENTOR

BY Cushman, Darby, & Cushman
ATTORNEY

METHOD AND DEVICE FOR BALANCING ROTORS

BACKGROUND OF THE INVENTION

It is known to balance a rotor in rotation by momentary and periodical bombardment of its heavy point, where the unbalance lies, with a sharply focused laser beam of high intensity. The laser pulses in this instance are released just when the point of unbalance in the rotor is located exactly in the path of rays of the laser beam. For focusing the laser beam, a convergent lens is used which is arranged in the path of rays between the laser and the rotor. At the point where the laser beam inpinges upon the outer periphery of the rotor the material is vaporized or melted through the high density of rays and then flug off during rotation under the action of the centrifugal force.

The density of rays of the laser beam substantially depends on the output of the laser used and on the accuracy of focusing. It is expedient to choose a power which is considerably higher than is necessary for generating the temperature required for melting the metal in order that as much material as possible may be removed and temperature of the external zone kept low. This is achieved by condensing the full power in a very short duration of impulse and be selecting a sharp focusing. This sharp focusing, however, brings about the disadvantage that the diameter of the apertures which can be made by means of the laser beam are only a few tenths of a millimeter across, so that in the event of relatively larger unbalance the aperture resulting from the removal of mass extends relatively deeply into the workpiece, which is, of course, most undesirable.

The possibility that might be considered of producing by means of less sharp focusing apertures of a larger diameter, which, therefore, do not extend too deeply into the workpiece is uneconomical and is, therefore, ruled out.

As can be seen from the foregoing, it is prerequisite to an accurate correction by means of a periodical laser beam that the intermittent laser beam always impinge upon the right point of the rotor, i.e., exactly at the location of the unbalance. The accuracy of the control of the laser beam must, therefore, meet exacting requirements which the known devices, however, cannot. This is a disadvantage particularly when relatively small unbalances are involved, since impinging of the laser beam upon the wrong place would make matters worse. Such inaccuracy of the action of the laser beam would result in disfiguring the exterior of the rotor, apart from making balancing take an unnecessarily long time.

The known methods for controlling laser beams are derived from balancing machines with stroboscopic system which use electrical filters for the elimination of disturbances as is known; the filters have a subsequent trigger circuit which triggers the stroboscopic flash.

In the case of small unbalances this frequently leads to the triggering of flashes which are caused by disturbances. The slowness of the eye permits, however, to detect at a sufficient degree of accuracy the angular location of even small unbalances on machines equipped with a stroboscopic system. If such a device is used for the control of a laser these wrong flashes of the stroboscope naturally cause a removal of mass at the wrong place.

Balancing machines for multiplicative measuring on the principle of frequency transposition and/or with watt-meter indication are unsuitable for the control of a laser, since they deliver values read on the instrument, that is to say values at fixed frequency but no test readings expressed as pulses of the rotor frequency.

SUMMARY OF THE INVENTION

With these shortcomings in consideration, it is the object of the invention to remove the aforementioned disadvantages and to propose an improved method and means for its application, avoiding that the apertures produced by the removal of mass extend too deeply into the rotor to be balanced. According to the invention, this problem is solved in that the unbalance is eliminated at several adjacent points, the center of which is the exact location of the unbalance, by means of displacing or swiveling the laser beam in relation to the exact position of the unbalance in the rotor.

According to a preferred embodiment, the laser beam for the purpose of displacement is sent through a convergent lens which is displaced along the rotor axis by a reciprocating motion at a frequency other than that of the sequence of shots and more particularly lower than that of the sequence of pulses of the laser beam.

According to a further preferred embodiment, the laser beam for the purpose of being displaced and swiveled is projected by means of a mirror with a subsequent convergent lens in the path of rays onto the rotor which by a reciprocating motion is swiveled at a frequency other than that of the sequence of shots and more particularly, lower than that of the sequence of pulses of the laser beam.

According to another preferred embodiment, the periodical triggering of the laser beam is controlled with the highest possible accuracy so that the points where the unbalance is to be removed are situated exactly one after another in peripheral direction of the rotor. It is evident that the control for the periodical triggering of the laser beam must operate most accurately in this case.

It is of advantage that the angular position of the pulses required for triggering the laser with respect to the unbalance of the rotor is still maintained even when the unbalance has already been completely or partially removed, in order that a final bombardment with a not-so-sharply focused laser beam can be made to "smooth" the place where mass has been removed. This serves for improving the appearance of the place of removal of mass.

A device for carrying out the method according to the invention is characterized in that means are provided by which the laser beam can be displaced and/or swiveled in relation to the exact location of unbalance, so that the unbalance is removed at several adjacent points, the center of which represents the exact position of unbalance. For displacing the laser beam, it may be practical to provide a convergent lens which by a reciprocating motion along the rotor axis is displaced at a frequency other than that of the sequence of shots and more particularly lower than the sequence of firings of the laser beam.

According to a preferred embodiment of the device, a mirror is provided which for the purpose of displacing or swiveling the laser beam can be turned to and fro or swiveled by a reciprocating motion. This oscillation may be effected at a frequency which is lower than that of the sequence of firings of the laser beam.

According to a further preferred embodiment, the moment of emission of pulses is stored, so that after the elimination of the unbalance the angular position of the pulses remains known and the place where mass has been removed can be bombarded again with a considerably defocused beam to avoid an undesirable crater formation imparting to the rotor an ugly appearance.

BRIEF DESCRIPTION OF THE DRAWINGS

Further details and characteristics of the invention will appear from the following description, preferred embodiments, and the accompanying drawings in which:

FIG. 1 represents the principle of known, PRIOR ART, balancing by means of periodical triggering of the laser beam;

FIG. 2 is a sectional view of a balancing notch produced by the known, prior art, method according to FIG. 1;

FIG. 3 is a sectional view of a "smoothed" balancing notch produced by a method based on the invention;

FIG. 4 is a sectional view of several balancing notches arranged according to the invention one after another in peripheral direction;

DETAILED DISCUSSION OF THE PRESENTLY PREFERRED EMBODIMENTS OF THE INVENTION

Figure 6:
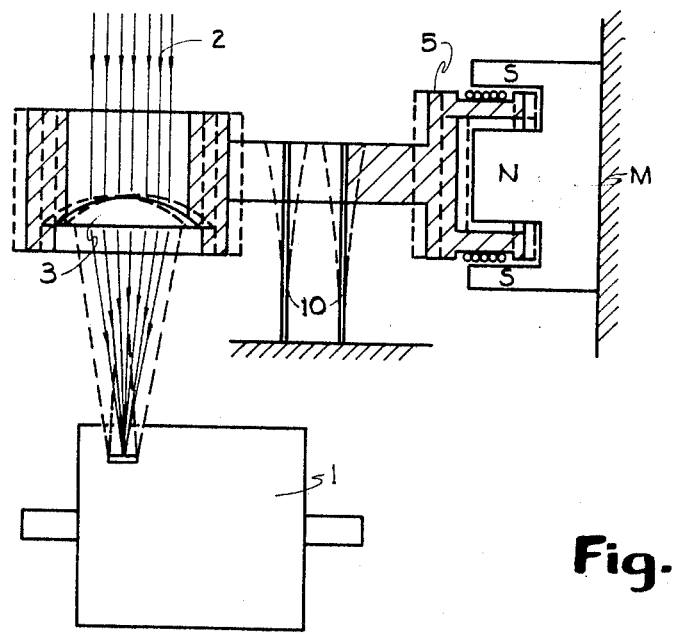
FIG. 6 is a diagrammatical view of a first preferred embodiment of a balancing device according to the invention.

FIG. 1 diagrammatically illustrates the known principle of balancing by means of an intermittent and/or periodically triggered laser beam 2 sharply focussed by means of a convergent lens 3 on a point 4 on the rotating peripheral area of a rotor 1 where the unbalance is situated. The balancing notch so obtained by repeated laser bombardment is illustrated on an enlarged scale in FIG. 2 and designated by the reference number 7. Reference number 6 pertains to the focussed portion of the laser rays. The mass originally contained in the area of the balancing notch 7 has partially been evaporated by the high temperature developed through the impinging laser beams and partially been transformed into a fused mass which has been flung off outwardly due to the high centrifugal force of the rotating body 1. A fusion zone 8, however, remains on the rotor 1 and forms disfiguring craters 9 on the outer periphery of the rotor.

FIG. 3 shows diagrammatically how according to the invention the craters 9 can be avoided, which shall be more fully described in the following. The principle of the "smoothed" balancing notch resides in the fact that the rotor is first bombarded with a sharply focussed laser beam producing a balancing notch as shown in FIG. 2. The convergent lens 3 is hereby in the position indicated by the solid lines. As soon as the removal of mass as required for balancing has completely or almost completely been performed, the lends 3 is shifted by the distance 11 into a position as indicated by the dotted lines, so that the laser rays are defocused, whereby the pool of molten metal 9 is burned off with, however, removal of only a very small mass at this time. "Smoothing" of the rotor surface in this way imparts to the balancing notch a very good appearance.

The above-mentioned "smoothing" according to the invention is, of course, only feasible if, after producing the balancing notch, that is to say after the complete or nearly complete removal of mass, the angle of unbalance is still known in the form of inphase pulses so that at the "smoothing" the laser pulses impinge upon the correct point.

Figure 5:
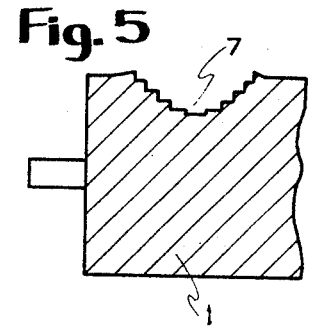
FIG. 5 is a sectional view of one only balancing notch comprising several notches side-by-side produced by a method based on the invention.

FIGS. 4 and 5 represent diagrammatically how extension of the balancing notch too deeply into the rotor is avoided, according to the invention. FIG. 4 shows several balancing notches 13 arranged precisely one after another in peripheral direction in an angular sector which is symmetrical to the accurate angular position 14 of the unbalance, in which case the accurate angular position of the unbalance is the center of the angular sector. Another possibility is illustrated in FIG. 5, where several balancing notches are provided side-by-side not in peripheral direction but parallel to the axis of the rotor, which interpenetrate and form as one composite balancing notch 7'.

FIG. 6 shows a preferred embodiment of a balancing device according to the invention suitable for producing the composite balancing notch 7' as illustrated in FIG. 5. The laser beam 2 is focussed by means of the convergent lens 3 onto the exterior peripheral surface of the rotating workpiece 1, whereby the periodical triggering of the laser beam is effected just when the point of unbalance lies in the path of rays. As known control means can be used for the periodical triggering of the laser beam, a description bearing on the matter has been omitted in connection with the embodiment of FIG. 6.

The lens 3 is supported on two leaf springs 10 and therefore capable to execute reciprocating oscillatory motions lengthwise the center line of the rotor 1. The lens 3 and the two leaf springs 10 are connected to a coil system 5 through which is passing alternating current and which is moving inside of a magnet M.

It is of advantage that the motion or oscillation of the convergent lens lengthwise the center line of the rotor is at a lower frequency than that of the sequence of firings of the laser during notch-forming. Thus, it is ensured that the single balancing notches are always arranged side-by-side or are adjacent and interpenetrate.

Figure 7:
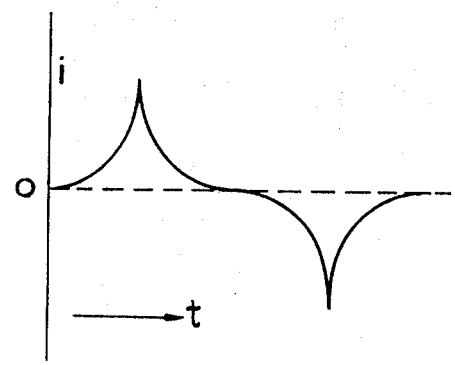
FIG. 7 is a diagrammatic view of the dependency of current upon the time for producing a balancing notch according to FIG. 5.

The coil system 5 is preferably energized by a current i having a dependence on time t as illustrated in FIG. 7 whereby mass is removed to the extent that the large balancing notch 7' represented in FIG. 5 is formed. According to the invention, it is thus achieved that in spite of the high intensity of the laser beam the removal of material is not accomplished punctiformly but over a larger area so that penetration into the rotor is not to deep.

Figure 8:
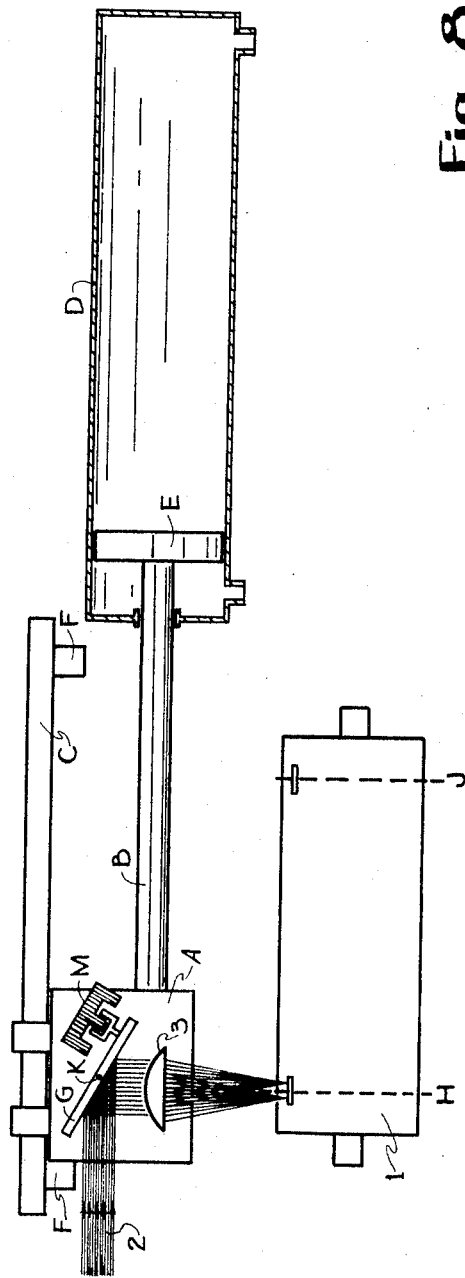
FIG. 8 is a diagrammatic view of a second preferred embodiment of the balancing device according to the invention.

FIG. 8 shows a second preferred embodiment providing a platform A which by means of a piston rod B can be displaced along a guide rod C in parallel to the center line of the rotor 1. The displacement is effected by means of a compressed-air cylinder D accommodating a piston E which is connected with the piston rod B.

Two stops F are arranged on the guide rod C and so adjusted that the laser beam 2 impinges upon the exterior peripheral surface of the rotor 1 in the area of correction plane H and/or J after having been deflected by a mirror G and focussed through the convergent lens 3. The mirror is pivoted in a fulcrum K. For the pivoting of the mirror G a coil L and a magnet M are provided, both of which are also fixed on the platform A with the coil L moving within the magnet M. If the coil L is energized by a current as shown in FIG. 7, a large balancing notch 7' as represented in FIG. 5 is produced in each plane of correction of the rotor. The balancing device according to FIG. 8, therefore, allows in a particularly economical manner to bombard two correction planes successively, thereby initiating a motion of the laser beam in axial direction of the rotor for achieving a removal of mass according to FIG. 5.

Figure 9:
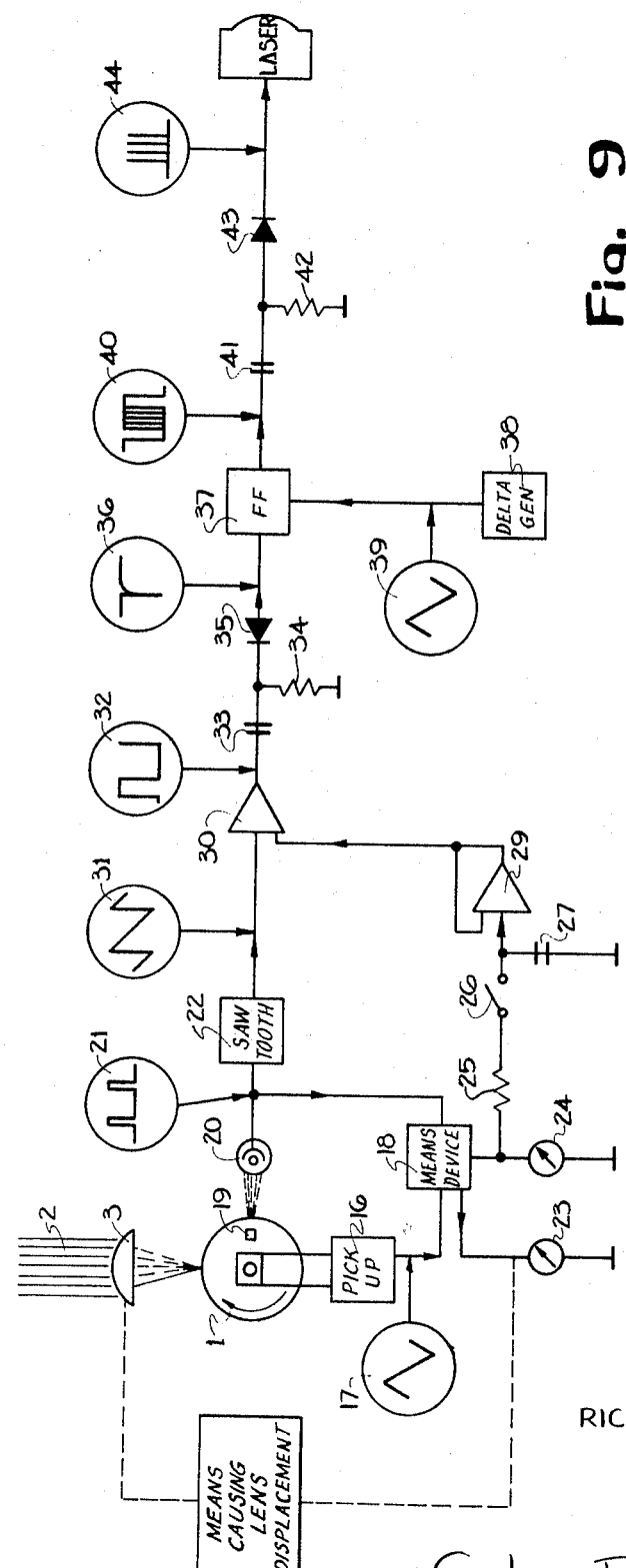
FIG. 9 represents a preferred embodiment of a circuit according to the invention for the control and triggering of the intermittent laser beam.

FIG. 9 diagrammatically shows a preferred embodiment of an electronic control according to the invention for the balancing device in question. The unbalance in the rotor 1 generates during its rotation an alternating current in a pickup 16 as depicted by the oscillogram 17. This alternating current is transmitted to a measuring device 18 according to the known principle of frequency transposition.

The rotor 1 presents a visual mark 19 which during rotation of the rotor is scanned by a photocell 20. The photocell so converts the visual mark 19 into pulses according to oscillogram 21. These pulses are used for the control of the measuring device 18 and for the control of the saw tooth generator 22.

A measuring instrument 23 shows the amount of unbalance. A measuring instrument 24 indicates the angular position of the unbalance related to the visual mark 19. A pulsating direct current proportionate to the angular position flows through the measuring instrument 24. If a contact 26 is made the pulsating direct current is smoothed through the intermediary of the resistor 25 and a capacitor 27. If the contact 26 is broken a direct current voltage is available in the capacitor 27 proportionate to the angular position of the unbalance. In order to prevent a discharge of the capacitor 27, an amplifier 29 with nearly infinite input resistance is provided. The output voltage is connected to the input of a comparator 30. The other input of the comparator 30 is connected to the output of the saw tooth generator 22. The peak voltage of the saw tooth generator 22 is adjusted to be equal to the maximum d.c. voltage available at the output of the amplifier 29. The slope of the output voltage 32 of the comparator 30 is consequently time-proportional to the angular position of the unbalance related to the visual mark 19.

The differentiating circuit, comprising a capacitor 33 and a resistor 34, together with a diode 35 produces a pulse 36. This negative pulse, therefore, is emitted properly timed in relation to the angular position of the unbalance.

A circuit 37 comprises essentially a controlled monostable flip-flop, its time constant being controllable by the delta voltage generated by a generator 38. Said delta voltage generator 38 produces a very low frequency through which the step-back slope of the mono-stable flip-flop 37 is modulated. The output voltage 40 of the mono-stable flip-flop by the intermediary of a differentiating circuit 41 and 42 and a diode 43 is converted into pulses 44 which are used for triggering the laser. On an average the pulses are dephased against the position of unbalance to an extent given by the basic time constant of the mono-stable flip-flop 37. By means of this basic time constant the angular position of the whole system can be so adjusted that the laser beam is triggered just in the moment when the heavy point passes the point where the laser beam impinges, in other words, when it is crossing the imaginary path of rays. The delta voltage generator 38 performs a phase modulation of the trigger pulse for the laser in symmetrical arrangement around the heavy point of the rotor so that the rotor is balanced by working several balancing notches in the sector illustrated in FIG. 3. During the measuring of unbalance, the contact 26 is made and the characteristics of the angular position are stored in the capacitor 27. Subsequently, the contact 26 is broken and the laser is switched in to shoot the hole pattern of FIG. 3 into the periphery of the rotor. The reduction of the unbalance can be observed on the measuring instrument 23 without that the angular position for the bombardment changes. If, for instance, the unbalance is reduced to 10 percent of the initial unbalance, the lens is displaced according to FIG. 3 and allowing for the angular position stored, a second bombardment by a considerably defocussed laser beam takes place so that the balancing notches are "smoothed" or deburred.

As is readily seen, the control and/or balancing device according to the invention has not the disadvantage to deliver as results values at a fixed frequency which can only be read on measuring instruments but they provide pulses of the rotor frequency. The control operating on frequency transposition according to the invention delivers the required pulses at the right moment and unaffected disturbing frequencies. It is particularly advantageous that the pulses may be distributed around the heavy point of the rotor for removal of the unbalance not by one single balancing notch but distributed over a sector.

The defocusing of the laser beam required for deburring and "smoothing" the single balancing notches is preferably effected automatically by readjusting and shifting the convergent lens when the amount of unbalance has been reduced to a certain extent, for instance 10 percent of the initial unbalance.

The frequency of the sequence of shots may be some a hundred cps; preferably one each laser shot is triggered on one revolution at the right moment. The vibration frequency of the devices according to FIG. 6 and 8 is preferably 10 percent of the frequency of the sequence of shots.

In the embodiment according to FIG. 8 the unbalances in each of the two correction planes are first detected in the manner known per se. After the determination of the two unbalance values which may be different in size and angular position, the unbalance is first eliminated in one plane and thereupon in the other one.

The circuit according to FIG. 9 may without difficulty be used also for controlling the laser beam and/or the frequency of the sequence of firings of the devices illustrated in FIGS. 6 and 8.

In this event, it is only necessary to adjust the amplitude 39 of the generator 38 to zero in order to have the various balancing notches situated one after another in peripheral direction according to FIG. 4 combined to one single balancing notch. The vibration of the lens and/or the mirror causes, however, said single balancing notch to be divided into a plurality of axially adjacent and more particularly interpenetrating holes as shown for instance in FIG. 5. The circuit to FIG. 9 can also readily be used in embodiments according to FIGS. 6 and 8 without adjusting the amplitude 39 of the generator 38 to zero. Because of the overlapping resulting from it, several balancing notches adjacent in peripheral direction according to FIG. 4 are produced which, however, are shaped as illustrated in FIG. 5 representing a sectional view in axial direction. The result, therefore, is an area with several balancing notches.

I claim:

1. A method for balancing a rotor comprising:
providing a rotor having an imbalance,
rotating said rotor,
determining the magnitude and angular location of an imbalance on the rotor resulting from excess mass producing an imbalance,
storing the angular location of said imbalance,
focusing a laser beam on to the periphery of said rotor,
successively bombarding the rotor with a high intensity laser beam at a plurality of closely spaced and different sites on said periphery, substantially centered upon the location of said imbalance, removing with each bombardment less than the whole amount of said excessive mass, but removing with the total of the bombardments the majority of said excessive mass,
moving intermediate at least some of said successive bombardments the laser beam and rotor relative to each other to move the site of impingement of the laser beam upon the rotor to thereby hit each of said closely spaced and different sites,
defocusing said laser beam after said closely spaced sites have been bombarded, and
rebombarding the rotor with the defocused laser beam at said stored location so that the beam impinges on an area around said sites having pools of molten metal to deburr said sites.

2. The method of claim 1 wherein said step of rotating includes the further step of rotating the rotor about a longitudinal axis thereof while being bombarded so that the mass lost is removed through a combination of being vaporized by the effect of the laser beam bombardments and being flug off the rotor due to centrifugal force generated through rotation of the rotor after being softened by the effect of the laser beam bombardments.

3. The method of claim 1 wherein said step of moving includes the step of shifting the laser beam and rotor slightly relative to each other parallel to a longitudinal axis of the rotor at a constant angular position, whereby mass is removed from the rotor in a plurality of longitudinally successive notches.

4. The method of claim 3 wherein the relative movement is so slight that at least some of the successive notches interpenetrate, thereby being contiguous with one another to create a composite notch.

5. The method of claim 1 wherein, said step of moving includes the step of moving the laser beam and rotor angularly of said longitudinal axis of the rotor, centered about the angular disposition of the excess mass, whereby mass is removed fro the rotor in a plurality of angularly successive notches.

6. The method of claim 1 wherein said step of moving includes the step of displacing the laser beam along a path of reciprocation at a frequency which differs from the frequency of said successive bombardments.

7. The method of claim 6, wherein the frequency of reciprocation of the laser beam is less than the frequency of said successive bombardments.

8. The method of claim 7 including the step of focusing the laser beam upon the rotor through a convergent lens and wherein said step of displacing includes the step of reciprocating said lens to provide the reciprocation of the laser beam.

9. The method of claim 7 wherein said step of displacing includes the step of impinging the laser beam, upstream from its impingement upon the rotor upon a reflecting surface and reciprocating said reflecting surface to provide the reciprocation of the laser beam.

10. The method of claim 1 wherein said step of bombarding includes the step of bombarding adjacent ones of said sites one after another in the direction of rotation of the rotor.

11. Apparatus for balancing a rotor having an imbalance resulting from excess mass effectively concentrated at a determinable angular disposition on the rotor, comprising:
means for mounting and rotating said rotor,
means for determining the magnitude and angular position of the imbalance and providing a signal indicating that position,
means for emitting a high intensity laser beam in successive, intermittent pulses,
means for slightly relatively moving the laser beam and the rotor intermediate at least some of the successive, intermittent pulses for successively bombarding the rotor with the high intensity laser beam at a plurality of closely spaced and different sites, substantially centered upon the angular position of said imbalance,
the intensity of the laser beam where it impinges upon the rotor being sufficient to vaporize or melt some of but less than the whole amount of said excessive mass with each bombardment, whereby with a plurality of such bombardments the majority of said successive mass may be removed,
means connected to said determining means for receiving said signal and for storing the angular location of said imbalance,
means connected to said storing means for causing said emitting means to emit said beam to produce said sites substantially centered at a location stored in said storing means,
means for receiving said laser beam and for focusing said laser beam onto said rotor, and
means connected to said focusing means for changing the focus of said laser beam onto said rotor so as to direct a defocused beam at the stored location so that the beam impinges on an area around said sites having pools of molten metal to deburr said sites.

12. The apparatus of claim 11 further including means for rotating the rotor about the longitudinal axis thereof during said bombardments thereof, whereby excessive mass which is melted by said laser beam may be flung from the rotor by centrifugal force.

13. The apparatus of claim 11 wherein the relatively moving means moves the impingement of the beam angularly of the rotor, centered about the angular disposition of the excess mass, whereby mass is removed from the rotor in a plurality of angularly successive notches.

14. The apparatus of claim 11 wherein the relatively moving means includes means for receiving the laser beam and displacing the laser beam so that the bombardment sites move along a path of reciprocation at a frequency which differs from the frequency of said successive bombardments.

15. The apparatus of claim 11 wherein said focusing means includes lens means selectively positionable in the path of said laser beam for varying the energy per unit area incident upon the sites bombarded by the laser beam and means selectively positioning said lens means in the path of said laser beam for varying the energy per unit area incident upon the sites bombarded by the laser beam.

16. The apparatus of claim 11 wherein the relatively moving means moves the impingement of the laser beam longitudinally of the rotor at a constant angular disposition, whereby mass is removed from the rotor in a plurality of longitudinally successive notches.

17. The apparatus of claim 16 wherein the relatively moving means moves so relatively slightly that at least some of the successively created notches interpenetrate, thereby being contiguous with one another to create a composite notch.

18. The apparatus of claim 11 wherein the relatively moving means includes means for receiving the laser beam and displacing the laser beam so that the bombardment sites move along a path of reciprocation at a frequency which is less than the frequency of said successive bombardments.

19. The apparatus of claim 18 wherein the focusing means includes a convergent lens mounted in the path of the laser beam and said moving means includes means for reciprocating the lens to provide the recited reciprocation of the laser beam.

20. The apparatus of claim 19 wherein said reciprocating means includes a vibrator connected to said convergent lens and having extremes of vibration on both sides of a null position, the null position being so disposed that when the laser beam is pulsed while the vibrator is in the null position thereof, the convergent lens focuses the laser beam upon the center of effective concentration of the excess mass on the rotor.

21. The apparatus of claim 18 wherein the relatively moving means includes a reflecting surface mounted in the path of the laser beam and means connected to said reflecting surface for reciprocating the reflecting surface to provide the recited reciprocation of the laser beam.

22. The apparatus of claim 21 wherein said moving means includes platform means movable longitudinally of the rotor for causing removal excess mass at any of a plurality of longitudinally spaced locations and said focusing means includes a convergent lens mounted in the path of said laser beam between said rotor and said reflecting surface wherein the reflecting surface, the means for reciprocating the reflecting surface and the convergent lens are mounted on said platform means.

* * * * *